United States Patent [19]

Bilbrey

[11] 3,967,577

[45] July 6, 1976

[54] PNEUMATIC CONTROL SYSTEM

[75] Inventor: Robert A. Bilbrey, Orinda, Calif.

[73] Assignee: California Controls Company, Berkeley, Calif.

[22] Filed: May 15, 1975

[21] Appl. No.: 577,757

[52] U.S. Cl. .................................................. 116/65
[51] Int. Cl.² ............................................. G08B 1/04
[58] Field of Search ................. 116/65, DIG. 7, 128, 116/70; 91/41; 92/27; 137/551, 552, 561 R

[56] References Cited
UNITED STATES PATENTS 3,033,171  5/1962  Engelbrecht ............................ 92/27
3,682,129  8/1972  Philbrick ................................. 116/65

FOREIGN PATENTS OR APPLICATIONS 675,080  11/1963  Canada ................................... 116/65

Primary Examiner—S. Clement Swisher
Assistant Examiner—Denis E. Corr
Attorney, Agent, or Firm—Fitch, Even, Tabin & Luedeka

[57] ABSTRACT

A pneumatic control system is described including a plurality of annunciators in which movable shuttle elements indicate normal and abnormal conditions. In the event an abnormal condition is sensed causing the shuttle element in any of the annunciators to move to the abnormal position, a bias pressure is applied to brake means in the annunciators to lock the position of the shuttle elements which have not moved. Thus, those of the annunciators which are not associated with an abnormal condition continue to indicate the normal condition.

12 Claims, 5 Drawing Figures

PNEUMATIC CONTROL SYSTEM

This invention relates generally to pneumatic control systems and, more particularly, to an improved pneumatic control system employing annunciators which will operate reliably with a wide range of sensing devices and with large variations in connecting line lengths.

Pneumatic control systems are frequently employed in situations where electrical or electronic control systems are undesirable or impractical. For example, the presence of explosive gases or environmental conditions such as salt spray may make the use of electricity undesirable. Often, pneumatic control systems are preferable to electronic control systems where a relatively large amount of power is needed for the control. This is because a pneumatic system often will operate with enough pressure to perform the control function (e.g. valve closure) directly and without the need for power amplification typically present in electronic systems.

A typical application of a pneumatic control system is in the monitoring of an unattended diesel engine installation. Such a system typically employs a number of sensors for monitoring such parameters as bearing temperatures, oil pressures, etc. When a sensor detects a malfunction, the control system operates to cause a shutdown or sound an alarm. The use of an array of mechanical annunciators or indicators on a control panel corresponding to the sensors enables the operator to determine the cause of the shutdown.

Where the sensors or sensing transducers for parameters such as oil pressure, bearing temperature, engine speed, etc., are located at different distances from the annunciator array, or are located at exceptionally long distances from the annunciator array, prior art systems have often encountered problems. Where substantially varying line lengths or exceptionally long line lengths exist in a pneumatic control system, time constants inherent in such a system may vary substantially, producing spurious signals and therefore erroneous indication of the source of the malfunction. Such spurious signals may also cause an indicator or annunciator which is already positioned to indicate an abnormal condition to return to indicating a normal condition (re-green) before observation can take place.

In order to compensate for problems connected with varying time delays, prior art pneumatic control systems have employed a variety of features, none of which has proved to be particularly satisfactory. Modification of bias delays on the indicators, check valves in the sensor lines, quick exhausts on the sensors, pulsed indicator biasing, and even mechanical detent arrangements in the annunciators themselves, may provide some limited sucess. Nevertheless, none of the foregoing features has been able to handle substantially all situations encountered in pneumatic control circuits. Add-on devices of various types can reduce some of the foregoing problems, but also serve to complicate the control system, reducing reliability and some times producing anomalies of their own.

In addition to the foregoing problems, prior art pneumatic control systems are typically unable to provide complete information at the time of an original start-up when many engine operating problems may occur. For example, a combination of low compressor suction, no lubrication oil in the engine, and a loose pneumatic connection to some other sensor would present an operator with many things to correct before being able to start the engine. Typical pneumatic control systems employ annunciators which normalize one by one and, when the sequence reaches an abnormal sensor, the sequence stops. As a result, the operator must repair the indicator malfunction, and then attempt to restart the engine before being informed of another malfunction.

It is an object of the present invention to provide an improved pneumatic control system.

Another object of the invention is to provide an improved annunciator for a pneumatic control system.

It is a further object of the invention to provide a pneumatic control system in which problems caused by inherent time delay differences are minimized.

Other objects of the invention will become apparent to those skilled in the art from the following description, taken in connection with the accompanying drawings wherein.

Very generally, the pneumatic control system of the invention comprises a plurality of annunciators 11, 12, 13, 14, 15, 16 and 17. Each annunciator has a shuttle element 18 therein responsive to a sensed condition to move between a first position (FIG. 2) at which a sensed normal condition is indicated to a second position (FIG. 4) at which a sensed abnormal condition is indicated. Each of the annunciators has spring means 19 therein biasing the shuttle element toward the second position. Each of the annunciators has brake means 21 therein responsive to a bias pressure to retain the shuttle element against movement. Means 22 apply a bias pressure to all of the brake means coincident with movement to any one of the shuttle elements from the first position to the second position upon sensing an abnormal condition. Accordingly, those of the annunciators for which a normal condition is sensed continue to indicate a normal condition.

Figure 1:
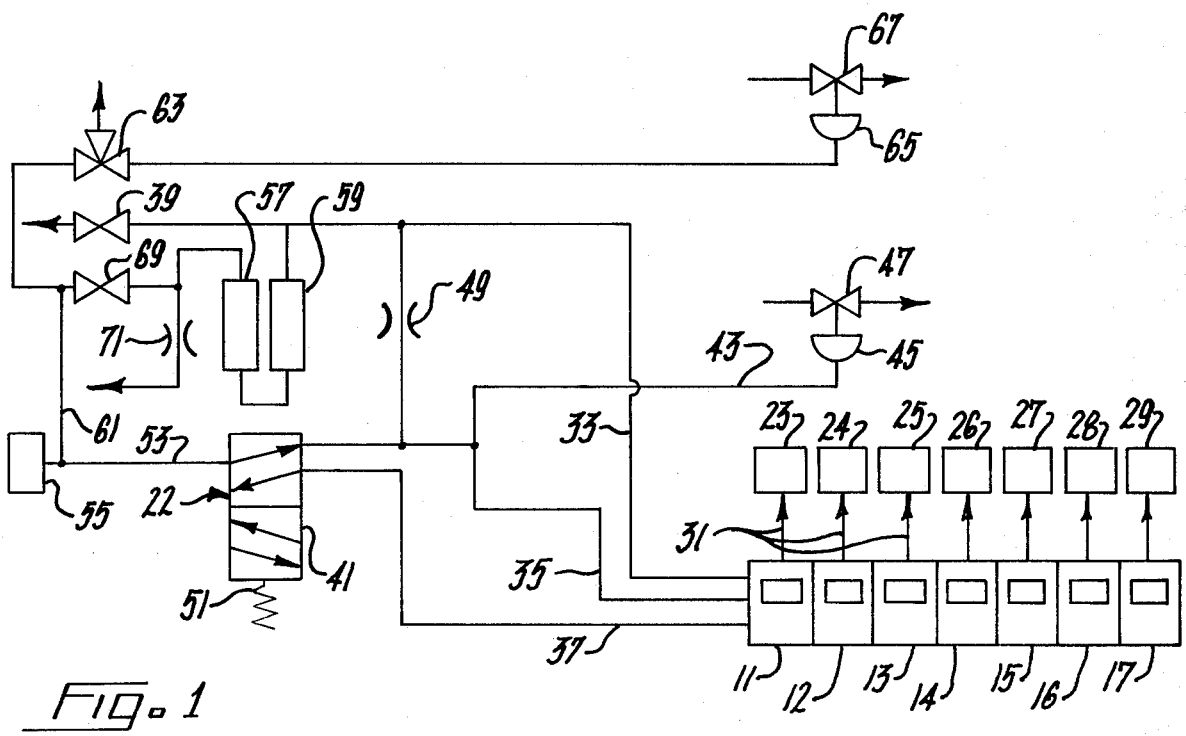
FIG. 1 is a simplified schematic diagram of a control system constructed in accordance with the invention.

Referring now more particularly to FIG. 1, each of the annunciators 11 through 17 is connected to a respective sensor 23, 24, 25, 26, 27, 28 and 29 by one of the lines 31. The sensors 23 through 29 may be of any suitable design currently commercially available and operate to sense various conditions in the apparatus being monitored. For example, monitoring of an engine's oil pressure, speed, bearing temperature, etc., may be critical operating parameters. When any one of the sensors measures an out-of-limit condition, it vents the line 31 connected thereto to atmosphere. This causes the annunciator to which it is connected to move to an abnormal condition to indicate the particular sensor which vented.

In addition to the annunciators 11–17 and the sensors 23–29 with connecting lines 31, the control system of the invention includes a trigger line 33 to which each of the annunciators is connected, and a common line 35 to which each of the annunciators is also connected. The annunciators 11–17 are also connected to a lock line 37. The trigger line 33 is connected to a valve 39 which is normally closed. The common line 35 is connected to a valve 41 as is the lock line 37. A branch of the common line 35 comprises a control line 43 which extends from the common line to a control element 45. The control element 45 operates a valve 47 which may be used, for example, to control the flow of fuel to an engine in connection with which the control circuit of the invention is used. An orifice connection 49 is made between the common line 35 and the trigger line 33.

The valve 41 is biased by a spring 51 from the position shown to its alternate position. In the position shown, a control air line 53, connected to a source 55 of pressure, is connected to the common line 35 and the lock line 37 is vented. Two operating pistons control movement of the valve 41 as will be explained subsequently. One of these operating pistons is indicated at 57 and the other is indicated at 59. The operating piston 57 is operable to move the valve 41 against the bias of the spring 51 to give the connections illustrated. The operating piston 59 serves as a locking piston for the valve 41. When the valve 41 is shifted to its other position, the control air line 53 is coupled to the lock line 37 and the common line 35 is vented.

The control air line 53 is coupled through a branch line 61 to a start air valve 63. The start air valve 63 applies air to a control element 65 which, in turn, controls a valve 67 for supplying air to the air starter for the engine, not illustrated. A valve 69 connects the coupling line 61 to the piston 57 and to an exhaust orifice 71. The piston 59 is connected to the trigger line 33.

In operating the system of the invention in connection with a gas or diesel fueled engine, the engine is started by having the operator depress the start valve 69. This causes the piston 57 to move the control valve 41 to the illustrated position. Air from the source 55 then passes through the common line 35 to the control element 45, opening the valve 47 to conduct fuel to the engine. At the same time, pressure in the trigger line 33 is built up, although more slowly, through the orifice 49. Control air pressure is also applied through the common line 35 to the annunciator array 11–17. As will be explained, the common pressure causes the annunciators to move to the normal position. The engine is then started by the operator depressing the valve 63 to open the same. This applies starting air to the control element 65 which opens the valve 67 and applies air to the air starter.

The operator continues to hold the valve 69 open until all of the annunciators normalize as a result of their monitored variables such as lube oil pressure, etc., assuming normal conditions. When all annunciators have moved to indicate a normal condition, the operator may then release the valve 69. The valve 41 is retained in the illustrated position as a result of the pressure built up in the trigger line 33 through the orifice 49 being applied to the piston 59. The engine is now started and running in the normal condition.

Upon the occurrence of a malfunction sensed by any of the sensors 23–29, the corresponding annunciator 11–17 is vented through the corresponding line 31.

When this occurs, as will be explained in greater detail, the trigger line 33 is vented by the vented annunciator. Pressure in the trigger line 33 falls as a result of the orifice 49 preventing application of control air thereto in sufficient magnitude as to maintain the pressure. The piston 59 is therefore depressurized and the valve 41 moves to its alternate unillustrated position as a result of the bias of the spring 51. In this latter condition, the piston 59 is exhausted, allowing the valve 41 to move to its alternate position. In this position, control air from the line 53 is applied to the lock line 37 and the common line 35 is exhausted or vented. As will be explained, pressure in the lock line 37 freezes or brakes the existing position of the annunciators in the array 11–17 with only the particular annunciator associated with the abnormal condition indicating an abnormality.

A normal shutdown may be accomplished when the operator depresses the valve 39, thus exhausting the trigger line 33. The same sequence occurs, but all indicators, since they are in the normal position, will continue to indicate normal. During the time of shutdown, as will be explained, the lines 31 are at atmospheric pressure as a result of the internal construction of the annunciators 11–17.

Because the lines 31, upon start-up, are at atmospheric pressure, the start-up condition in which the lock line is vented causes the bias springs in the annunciators to move each annunciator to the abnormal indicating condition. As the pressure in each of the lines 31 builds up, as will be explained below, each indicator or annunciator 11–17 turns normal. This will occur at random times dependent upon line lengths, etc. As a result, rapid and complete identification of variables which fail to normalize upon start-up is possible. Moreover, each annunciator is exercised with each start-up, enabling determination of their operability. The annunciators do not serve as relays in the system. Accordingly, failure of an annunciator to function properly such as by sticking or other internal breakdown will not prevent the circuit from shutting down.

Referring now more particularly to FIGS. 2–5, the internal construction of the annunciators 11–17 may be seen. Each of the annunciators is of identical construction and, therefore, only one will be described herein. The annunciator includes an outer housing comprised of a top plate 73, a cylinder 75, a flange 77, a cup 79, and a bottom plate 81. Through bolts 83 attach the top plate 73 and the cylinder 75 to the flange 77. An index pin 87 correctly lines up the device for proper port mating. Bolts 89 are provided near the periphery of the flange 77 for the purpose of securing the annunciator to an immediately adjacent annunciator to make up the annnunciator array. The housing may be comprised of a suitable plastic material to resist corrosive atmospheres. The cup 79 mates with the flange 77 at a tapered opening 91 therein and is force-fit. The bottom plate 81 is secured to the cup 79 in a recess 93 by suitable means, not shown.

The top plate 73 is provided with an upper threaded opening 95 to which the line 31 (FIG. 1) is attached. The cylinder 75 defines an upper chamber 97 and the cup 79 defines a lower chamber 99. The upper and lower chambers are contiguous and are separated by the shuttle element 18 which is capable of moving axially therein.

The shuttle element 18 includes a piston having an upper portion 101 of reduced diameter connected to a main portion 103 having a diameter which provides a sliding fit within the chamber 97 defined by the cylinder 75. A frustoconical section 105 joins the upper section 101 and the main section 103. An annular groove 107 is provided in the main portion 103 for carrying an annular resilient seal 109. An annular groove 111 is formed in the main portion 103 just below the groove 107 for reasons which will be explained below. The lower end of the piston is joined to an indicator carrier 113 by a section 115 of enlarged diameter. The indicator carrier is provided with a flexible plastic strip 117 which extends therefrom into a curved slot 119 formed in the base of the cup 79. A rectangular opening 121 communicates with the central portion of the slot 119 and is aligned with a window 123 formed in the bottom plate 81. A clear plastic plate 125 is disposed in a recess 127 in the bottom of the base of the cup 79 between the opening 121 and the window 123. Depending upon the sliding position of the strip 117 in the slot 119, which in turn depends upon the position of the shuttle element 18, a portion of the strip 117 will be observable through the window 123. The strip is made part red and part green such that the green portion will be visible through the window 123 in the condition illustrated in FIG. 2. A recess 129 is formed in the indicator carrier 113 for accommodating the free end of the strip 117.

The base of the cup 79 is provided with an interior recess 131 aligned on its axis and which accommodates the spring means 19. As illustrated, the spring means 19 comprise a coil spring captured in the recess 131 and aligned on the axis of the cup 79 engaging the indicator carrier 113. The spring is such as to bias the shuttle element 18 upwardly. The cylinder 75 is provided with a downwardly extending annular appendage 133 which extends within the flange 77 and which is sealed thereto by an annular seal 135. The flange 77 has an annular shelf 137 projecting inwardly therefrom spaced from the lower end of the projection 133 and forming an annulus 139. An annular resilient member 141 of suitable cross section is disposed in the annulus 139 for reasons explained below. The cross-sectional diameter of the member 141 is substantially equal to the distance between the lower end of the projection 133 and the upper surface of the shelf 137, providing a sealing relationship therebetween. As will be explained, the annular groove 111, the annulus 139 and the resilient member 141 together constitute the brake means 21 of the annunciator. A locking pressure gallery 143, comprising a linear hole, passes entirely through the housing of the annunciator in the flange 77 and a brake or locking pressure passage 145 communicates between the locking gallery 143 and the annulus 139 on the side of the resilient member 141 opposite the annular groove 111. The line 37 (FIG. 1) is connected to the gallery 143.

A common pressure gallery 147 extends through the flange 77 parallel with the gallery 143 and is connected to the common line 35 (FIG. 1). A passage 149 extends from the common gallery 147 to a circular recess 151 in the top of the flange 77. An annular seal 153 surrounds the terminus of the passage 149 in the recess 151 and forms a seal against the under-surface of the cylinder 75. A passage 155 extends from the recess 151 through the cylinder 75 and connects with the upper chamber 97 through a restrictive orifice 157. Thus, air pressure from the common line 35 is able to pass through the passages 149 and 155 and through the orifice 57 into the upper chamber 97.

A trigger gallery 161 passes through the flange 77 parallel with the lock gallery 143 and the common gallery 147. The trigger line 33 (FIG. 1) is connected to the trigger gallery 161. The gallery 161 is connected to a circular recess 163 in the upper surface of the flange 77 by a passage 165. An annular seal 167 surrounds the terminus of the passage 165 and sits in the recess 163 abutting the under-surface of the cylinder 75 and forming a seal therewith. A passage 169 communicates with the recess 163. At the opposite end of the passage 169, an annular groove 171 in the interior wall of the cylinder 75 communicates with the passage. An annular resilient member 173 of circular cross section seats in the "vee" shaped groove 171 and forms a seal at the end of the passage 169 between the passage 169 and the upper chamber 97.

Figure 2:
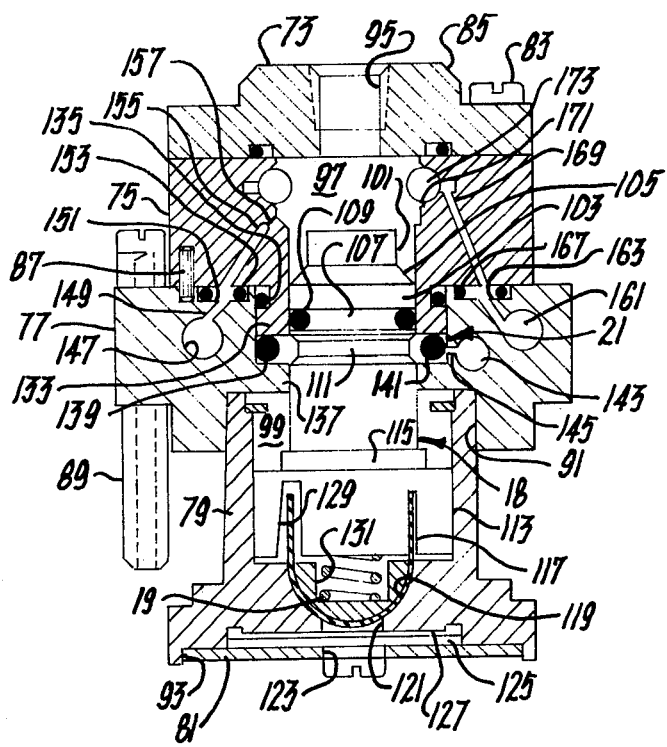
FIG. 2 is a full section view of an annunciator used in the system of FIG. 1 with the system operating in the normal condition.

As previously mentioned, FIG. 2 illustrates the annunciator of the invention in the normal condition in which the green portion of the strip 117 registers with the window 123. In this condition, the shuttle element 18 is disposed toward the lower extreme of its motion, with the indicator carriage 113 abutting the lower end of the chamber 99. In this condition, the pressure in the upper chamber 97 holds the shuttle element in place against the bias of the spring 19 and the sensor to which the upper chamber 97 is connected is unvented.

Figure 3:
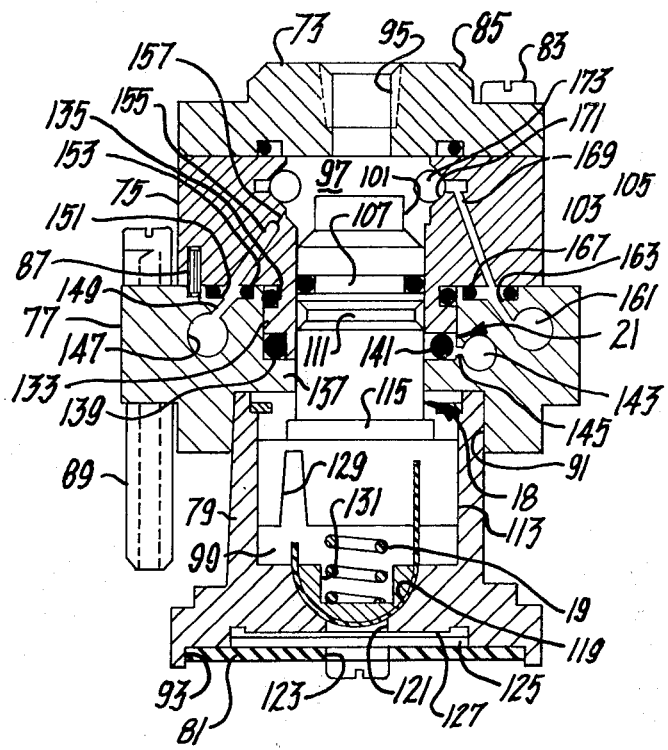
FIG. 3 is a full section view of an annunciator used in the system of FIG. 1 illustrating the beginning of venting due to an abnormal condition.

Upon sensing a malfunction, the sensor to which the annunciator is connected begins to vent to atmosphere, venting the associated line 31 and, therefore, venting the upper chamber 97. This condition is indicated in FIG. 3. At the same time, the trigger line 33, through the gallery 161, causes a flow in the passages 165 and 169 as a result of the check valve action of the annular element 173 by pressure in the annular groove 171 on the opposite side of the element 173 from the chamber 97. Flow from the common line 35 also occurs through the gallery 147 and the passages 149 and 155. However, because of the orifice 157, the common line is not vented as quickly as the trigger line. The pressure difference maintained by the orifice 49 (FIG. 1) thereby causes a tripping of the pilot valve 59 (FIG. 1) as previously explained. As the pressure reduces in the upper chamber 97, the shuttle element 18 moves upwardly, causing a corresponding movement of the indicator strip 117.

Figure 4:
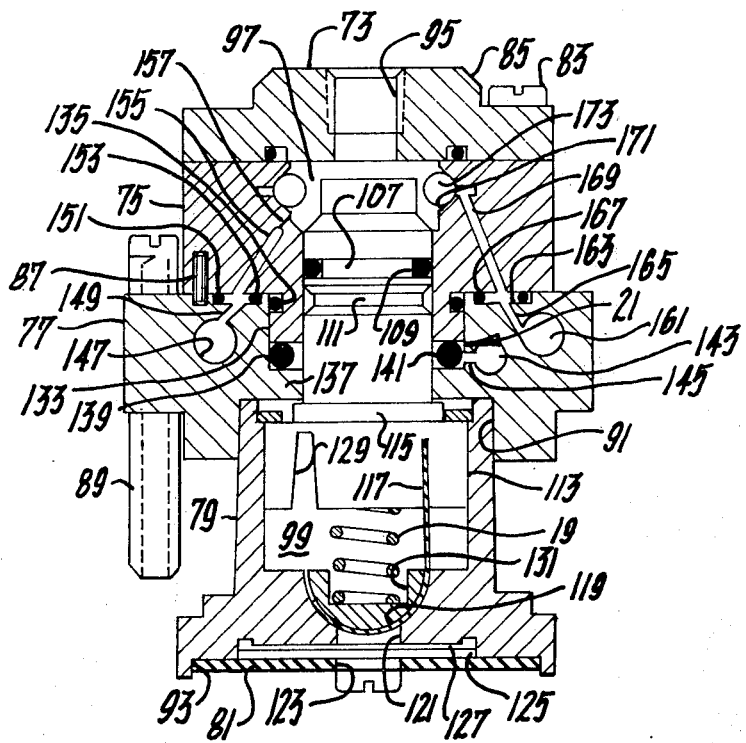
FIG. 4 is a full section view of an annunciator used in the control system of FIG. 1 illustrating the unvented condition when shutdown is complete.

As the venting process nears completion, the annunciator approaches the condition illustrated in FIG. 4. The gallery 161 and the gallery 147 continue to exhaust through the chamber 97, and pressure in the chamber 97 continues to fall, allowing the spring 19 to bias the shuttle element 18 upwardly toward the upper end limit of its travel.

In FIG. 4, the shuttle element 18 has reached the upper limit of its travel, with the indicator strip indicating red through the window 123 and with movement of the shuttle element limited by the section 115 of enlarged diameter abutting the lower end of the shelf 137. In this condition, as previously explained, pressure is applied to the lock gallery 143, forcing the resilient member 141 toward the shuttle element. For the annunciator in connection with which an abnormal condition exists, the resilient member 141 rides against the smooth outer surface of the section 103 of the shuttle element, and thus does not inhibit movement of the shuttle element appreciably. In the case of those annunciators for which no abnormality exists, however, the effect of pressurization of the loading gallery is different.

Figure 5:
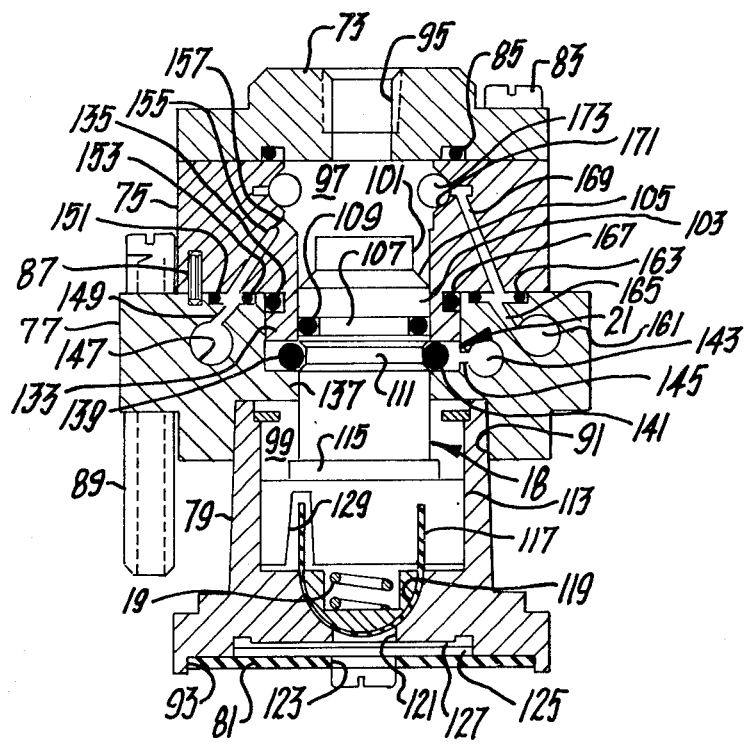
FIG. 5 is a full section view of an annunciator used in the system of FIG. 1 illustrating the condition existing upon shutdown of an annunciator for which an abnormal condition has not been sensed.

The latter condition is illustrated in FIG. 5 wherein pressure in the locking gallery applied to the annulus 139 through the passage 145 forces the resilient locking element 141 into the groove 111. This effectively prevents any movement of the shuttle element due to the bias of the spring 19 and thereby retains that particular annunciator in the green condition. To allow pressurization of the locking gallery 143 before movement of the shuttle element 18 due to depressurization of the upper chamber 97, the orifice 157 is provided. This orifice prevents a rapid depressurization of the chamber 97 except, of course, in the case where venting results from actuation of the sensor to which the chamber 97 is connected. Thus, although the chambers 97 in the normal annunciators eventually depressurize due to a depressurization of the common line 35, they are held in their normal or green condition due to the locking pressure.

Also, in the case of the annunciator for which no abnormality exists, the check valve action of the annular element 173 in each isolates that annunciator from the abnormal one. Thus, the normal annunciators remain unvented in their upper chambers, retaining the green condition even though the abnormal annunciator has vented the trigger line.

Upon engine start-up as previously described in connection with the control system, the pressure in the locking galleries of the various annunciators is vented. This releases the braking elements 141 and causes the springs 19 to force the shuttle elements 18 to the upper end of their travel. Thus, all annunciators will snap red during the start-up process. As pressure builds up in the common line 35, air will pass into the upper chambers 97 of the annunciators from the galleries 147 and pass to the sensors to which they are attached through the lines 31. Depending upon line length and parameter being measured, each of the sensors will eventually allow pressure to rise in the upper chamber 97 of its associated annunciator, causing movement of the shuttle elements 18 against the bias of the springs 19. This pressure also forces the annular elements 173 into the grooves 171 and thus blocks off the trigger galleries 161 and therefore the trigger line 33. This is similar to the condition illustrated in FIG. 3. Eventually, the annunciators return to the condition indicated in FIG. 2 with the system running normally. In the event of an abnormality, the particular annunciator associated therewith will remain vented and therefore will not turn green and the operator will be able to tell immediately the source of the malfunction.

Because the annunciator of the invention is not a relay, if the shuttle element or other moving parts jam, the logic sequence of the control system will not be impaired. Although an improper panel indication may result, the engine or process will still be shut down by the system, even if the orifice 157 should plug. The period of susceptibility to spurious signals is reduced to less than 0.1 second. This is the time that it takes for the pressure to build up in the locking gallery and thus freeze all unaffected indicators in the green condition. This also reduces the likelihood of re-green problems as a result of time delays. Trapped pressure in the sensor line 31 cannot repressurize the annunciator sufficiently against the bias of the coil spring 19 to show a green condition.

A significant advantage in the system and annunciator of the invention is that during every engine start-up, all annunciators initially snap to red. Each annunciator will turn green or normalize randomly as each sensor line 31 builds up to pressure. If a malfunction with a particular sensor occurs before start-up or should a sensor line have a severe leak, the affected annunciator will remain red. If only one annunciator is affected, only that annunciator will show red. If several are affected, those will show red and the others will turn green. Thus, it is easy for the operator to determine the precise cause of trouble during start-up without restarting the engine several times to go through a series of relay type annunciators. Moreover, because each annunciator is exercised on start-up, sticking or otherwise improper function in an indicator may be readily observed and corrected.

Because the annunciators are constructed in such a way that they may be nested together, such as with a dovetail mount, the annunciators are easily installed in a compact arrangement, for ready observation. The linear parallel galleries minimize the necessary connections per indicator and maintenance is readily effected. Thus, a very high panel density is possible with a minimum of the space necessary to accommodate interconnecting piping and maintenance clearance.

Due to the construction of the annunciators, corrosion resistant materials such as acetal and polyester plastics may be employed.

It may be seen, therefore, that the invention provides an improved pneumatic control system and an improved annunciator for use therein whereby multiple indication or reinstatement of indicators is substantially avoided. Comprehensive start-up information is provided, as well as high corrosion resistance, ease of installation and maintenance, and small physical size. Improper function of an annunciator in the system does not result in a malfunction of the overall system.

Various modifications of the invention in addition to those shown and described herein will become apparent to those skilled in the art from the foregoing description and accompanying drawings. Such modifications are intended to fall within the scope of the appended claims.

What is claimed is:

1. A pneumatic control system comprising, a plurality of annunciators, each having a shuttle element therein responsive to a sensed condition to move between a first position at which a sensed normal condition is indicated and a second position at which a sensed abnormal condition is indicated, each of said annunciators having spring means therein biasing said shuttle element toward said second position, each of said annunciators having brake means therein responsive to a bias pressure to retain said shuttle element against movement, and means for applying a bias pressure to all of said brake means upon movement of any one of said shuttle elements from the first position to the second position upon sensing an abnormal condition, whereby those of said annunciators for which a sensed normal condition exists continue to indicate a normal condition.

2. A pneumatic control system according to claim 1 including a trigger line and control means responsive to venting of said trigger line, each of said annunciators further including means for venting said trigger line in the event of a sensed abnormal condition.

3. A pneumatic control system according to claim 2 wherein said control means include a valve responsive to venting of said trigger line to move from a first position to a second position at which said bias pressure applying means are coupled to said brake means.

4. A pneumatic control system according to claim 2 wherein said bias pressure applying means comprise a lock line and a source of pressure, wherein said control means include first valve means responsive to an applied bias pressure to maintain a normal control condition and responsive to removal of said bias pressure to produce an abnormal function, and wherein said control means further include second valve means movable in response to venting of said trigger line from a first position at which said source is coupled to said first valve means to a second position at which said source is uncoupled from said first valve means and coupled to said lock line.

5. A pneumatic control system according to claim 1 including a trigger line and control means responsive to venting of said trigger line, each of said annunciators including means for venting said trigger line in response to a sensed abnormal condition, wherein said bias pressure applying means comprise a lock line and a source of pressure, wherein said control means include valve means movable in response to venting of said trigger line from a first position wherein said bias source is uncoupled from said lock line to a second position at which said bias source is coupled to said lock line.

6. A pneumatic control system according to claim 5 wherein said control means include further valve means responsive to an applied bias pressure to maintain a normal control function and responsive to removal of said bias pressure to produce an abnormal control function, and wherein said first-named valve means couple said source to said further valve means when in said first position.

7. An annunciator for a pneumatic control system, comprising, a housing, a shuttle element in said housing responsive to a sensed condition to move between a first position at which a sensed normal condition is indicated and a second position at which a sensed abnormal condition is indicated, spring means biasing said shuttle element toward said second position, and brake means responsive to a bias pressure to retain said shuttle element against movement from said first position to said second position.

8. An annunciator according to claim 7 wherein said brake means comprise an annulus formed in said housing surrounding said shuttle element, an annular resilient member seated in said annulus, and a lock port in said housing for conveying bias pressure to said annulus on the side of said resilient member opposite said shuttle element for compressing said resilient member to engage said shuttle element.

9. An annunciator according to claim 8 wherein said shuttle element is provided with an annular groove aligned with said resilient member with said shuttle element in the first position.

10. An annunciator according to claim 7 wherein said housing includes a trigger line port and a sensor port, and wherein a check valve couples said trigger line port to said sensor port for venting a trigger line when said sensor port is vented.

11. An annunciator according to claim 10 wherein said check valve comprises an annulus formed in said housing and an annular resilient member seated in said annulus, said trigger port communicating with said annulus and being closed by said resilient member when said sensor port is pressurized and being compressed when said sensor port is vented to vent said trigger port.

12. An annunciator according to claim 7 including a sensor port which, when vented, allows said shuttle element in said housing to be moved by said spring means to said second position, a common port communicating with said sensor port for providing pressure thereto, a trigger line port, a check valve coupling said trigger line port to said sensor port for venting a trigger line when said sensor port is vented, said brake means including a lock port in said housing for conveying bias pressure to said brake means, said housing having a lock gallery communicating with said lock port, a trigger gallery communicating with said trigger line port, and a common gallery communicating with said common port, said galleries comprising substantially parallel passages in said housing extending from one side of said housing to the other for permitting a plurality of housings to be nested adjacent each other with said respective galleries in communication.

* * * * *